(12) United States Patent
Montevirgen et al.

(10) Patent No.: US 8,804,353 B2
(45) Date of Patent: Aug. 12, 2014

(54) TRIM FOR INPUT/OUTPUT ARCHITECTURE IN AN ELECTRONIC DEVICE

(71) Applicant: Apple Inc., Cupertino, CA (US)

(72) Inventors: Anthony S. Montevirgen, San Francisco, CA (US); Emery A. Sanford, San Francisco, CA (US); Kenneth A. Jenks, Cupertino, CA (US); Anna K. Shedletsky, Mountain View, CA (US); Daniele De Iuliis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/833,061

(22) Filed: Mar. 15, 2013

(65) Prior Publication Data
US 2014/0069712 A1   Mar. 13, 2014

Related U.S. Application Data

(60) Provisional application No. 61/699,691, filed on Sep. 11, 2012.

(51) Int. Cl.
*H05K 5/00* (2006.01)
*H02G 3/22* (2006.01)

(52) U.S. Cl.
CPC ...................................... *H02G 3/22* (2013.01)
USPC .......................................... 361/756; 361/810

(58) Field of Classification Search
CPC ....................................................... H02G 3/22
USPC ............ 361/730, 752, 756, 810; 439/148, 34, 439/527
See application file for complete search history.

(56) References Cited

U.S. PATENT DOCUMENTS

| | | | | |
|---|---|---|---|---|
| 5,002,184 | A | * | 3/1991 | Lloyd ........................... 206/305 |
| 6,052,279 | A | * | 4/2000 | Friend et al. ............. 361/679.32 |
| 6,178,096 | B1 | | 1/2001 | Flickinger et al. |
| 6,229,695 | B1 | * | 5/2001 | Moon ......................... 361/679.3 |
| 6,244,886 | B1 | | 6/2001 | Strang et al. |

(Continued)

FOREIGN PATENT DOCUMENTS

WO   2011160138 A2   12/2011

OTHER PUBLICATIONS

International Search Report and Written Opinion for International PCT Application No. PCT/US2013/056594, mailed Nov. 21, 2013, 10 pages.

(Continued)

*Primary Examiner* — Yuriy Semenenko
(74) *Attorney, Agent, or Firm* — Kilpatrick Townsend & Stockton LLP

(57) ABSTRACT

A trim is provided which may be substantially concealed in an electronic device housing. Embodiments may be configured to distribute received forces away from internal components of an electronic device. Further some embodiments may be configured to align an electronic device housing with the internal plug receptacle for ease of assembly. Some embodiments may be configured to align a plug with the plug receptacle during plug attachment to ensure the correct attachment of the plug. Further embodiments may be made of a substantially rigid material to sustain repeated cycles plug insertion and removal. Additional embodiments may limit the ability for moisture to access the internal components of the electronic device. Certain embodiments may be interposed between a plug receptacle and an electronic device housing.

25 Claims, 10 Drawing Sheets

(56) References Cited

U.S. PATENT DOCUMENTS

| | | | |
|---|---|---|---|
| 6,361,357 B1 | 3/2002 | Stillwell et al. | |
| 6,388,877 B1 * | 5/2002 | Canova et al. | 361/679.56 |
| 6,625,013 B2 * | 9/2003 | Minaguchi et al. | 361/679.55 |
| 7,209,113 B2 * | 4/2007 | Park | 345/156 |
| 7,481,664 B1 | 1/2009 | Knoll et al. | |
| 7,652,892 B2 | 1/2010 | Shiu et al. | |
| 7,753,701 B2 | 7/2010 | Tsuji | |
| 2005/0032415 A1 | 2/2005 | Sakamoto | |
| 2005/0124218 A1 | 6/2005 | Chen et al. | |
| 2005/0202727 A1 | 9/2005 | Andre et al. | |
| 2009/0130875 A1 | 5/2009 | Guo | |
| 2009/0269962 A1 | 10/2009 | Miller et al. | |
| 2010/0323554 A1 | 12/2010 | Shiu | |
| 2010/0323562 A1 | 12/2010 | Yash | |
| 2011/0068665 A1 | 3/2011 | Cao | |
| 2012/0008292 A1 | 1/2012 | Nichols et al. | |
| 2012/0051025 A1 | 3/2012 | Jol et al. | |
| 2012/0181317 A1 | 7/2012 | Evens | |
| 2014/0014408 A1 | 1/2014 | Milheiro et al. | |
| 2014/0069713 A1 | 3/2014 | Golko et al. | |
| 2014/0069714 A1 | 3/2014 | Uttermann et al. | |

OTHER PUBLICATIONS

International Search Report and Written Opinion for International PCT Application No. PCT/US2013/056591, mailed Nov. 21, 2013, 10 pages.

International Search Report and Written Opinion for International PCT Application No. PCT/US2013/056596, mailed Dec. 4, 2013, 14 pages.

Notice of Allowance for U.S. Appl. No. 13/833,421, mailed Apr. 3, 2014, 15 pages.

Notice of Allowance for U.S. Appl. No. 13/833,224, mailed Apr. 10, 2014, 15 pages.

* cited by examiner

TRIM FOR INPUT/OUTPUT ARCHITECTURE IN AN ELECTRONIC DEVICE

CROSS REFERENCE TO RELATED APPLICATIONS

This application is a non-provisional, claiming benefit under 35 U.S.C. §119(e), of U.S. Patent Application No. 61/699,691 filed Sep. 11, 2012 for "Trim For Input/Output Architecture In An Electronic Device". The entire disclosure of the above mentioned application is incorporated by reference for all purposes.

BACKGROUND OF THE DISCLOSURE

Electronic devices have exponentially increased in complexity and capability over the past couple of decades. There is an ongoing push to increase electronic device capabilities and the possibilities are endless. For example, mobile phones are now able to browse the internet, download multimedia, and act as an electronic wallet, a GPS device, and a digital camera. A somewhat conflicting interest is to maintain a reasonable size for electronic devices. For example a mobile device becomes a lot less "mobile" if it becomes too bulky. Thus, one option has been to continually reduce the size of electronic device components so that new capabilities, functions, and components may be added without substantially increasing the total size of the electronic device. As components continually reduce in size, the components become more susceptible to damage from outside forces. Thus a need arises to minimize external forces on the internal components of an electronic device to increase the durability of the electronic device and to ensure the electronic device's continued uninterrupted operation. Moreover, as electronic devices become more portable and more of an everyday necessity, the chances of inadvertent water exposure to the internal components increases. Thus an equally important need arises to minimize harmful water exposure to an electronic device's internal components.

Electronic device cases and housings, to an extent, help protect the electronic device's internal components from outside forces and water damage. However, many electronic device cases and housings have openings for various input and output devices such as headphones, keyboards, displays, and data/power cables. Internal components at these areas are more susceptible to damage. For instance, water may be introduced into the electronic device at these openings and may damage internal components throughout the device. Additionally, external forces on the electronic device itself or an attached cable/plug may be transferred directly to the internal components. For example, the internal components of a computer, mobile phone, or tablet may be damaged when a person accidentally trips over a power cable while the device is plugged in and charging. Additionally, some internal components may be damaged by the improper or forceful insertion of plugs into the plug receptacles. Further, with the growing use of docking stations, internal components may be damaged when a mobile device is inadvertently hit or twisted while docked.

Moreover, design aesthetics may be a consideration in addressing these issues because aesthetics can play an important role in developing a brand image and a company trademark. This is especially true for mobile devices such as mobile phones, laptops, and tablets. The current mobile devices are far slimmer, sleeker, and more seamless in design compared to the design of mobile devices a decade ago. Thus, it would be preferable to protect the internal components of an electronic device without requiring bulky external features such as large cable screws for screwing a cable/plug directly into the device housing. External configurations may detract from a slim, sleek, and seamless design or from a brand image or company trademark.

SUMMARY OF THE DISCLOSURE

Certain embodiments of the invention generally provide a system and apparatus which may be substantially concealed in an electronic device housing to protect the internal components of the device at plug attachment and detachment locations. Some embodiments of may be utilized in electronic devices to receive and to distribute forces away from sensitive internal components. For example, some embodiments can distribute external forces to a side housing of an electronic device, and some can distribute received forces to other portions of the electronic device case or other internal support structures. Other embodiments may reduce the risk of introducing moisture to sensitive internal components of the electronic device. Some embodiments may be configured to help align a plug with an internal plug receptacle during plug attachment so as to ensure proper plug insertion. Various embodiments may be manufactured as a single component or multiple components. Further, some embodiments may be constructed of a substantially hard and ridged material such as stainless steel such that the embodiment can withstand repeated cycles of plug insertion and removal.

For example, in one embodiment of the present invention, a stainless steel trim is provided for use with a mobile device such as a mobile phone, laptop, or tablet. The stainless steel trim is interposed between the mobile device's external housing and the internal plug receptacle of a mobile device. Ring seals are fitted between each of the components to reduce the chances of moisture penetration into the electronic device. The stainless steel trim has an elongate lip which is configured to closely fit and engage with an opening on a side wall of the external housing. The close-fitting lip facilitates proper alignment between the trim and the device housing and further limits the ability for moisture to access the sensitive internal components of the device. An elongate opening extends through the lip of the stainless steel trim to the trim's back surface so as to allow plug access to the internal plug receptacle. The walls of the elongate opening are configured to closely fit with a received plug. Additionally, the back surface of the stainless steel trim may include engagement features for aligning and engaging the trim with the internal plug receptacle. The close fitting elongate opening and the alignment with the internal plug receptacle help guide a plug during plug attachment to the internal plug receptacle to ensure proper plug insertion. Further, the stainless steel trim further includes a bracket which fastens the trim to a back portion of the mobile device housing to distribute received forces.

Relative forces between the mobile device and an attached plug, aside from translational forces along the plug's insertion axis, can, in this embodiment, be transferred to the stainless steel trim at the trim's elongate opening. Thus movements of the plug relative to the mobile device, except for engagement and disengagement motions, impart forces on the walls of the elongate opening of the trim. The attached plug makes contact with the close-fitting walls of the trim's elongate opening and these walls receive a portion of the external forces. The stainless steel trim may then distribute the received forces to the back surface of the mobile device through the fastened bracket. Furthermore, the trim may distribute forces to the mobile device side wall. Similar to the interaction between the attached plug and the walls of the trim opening, the elongate lip of the trim contacts the close-fitting walls of the housing opening. The walls of the housing opening receive forces from the trim and further distribute the force to the side wall of the housing. Absent the stainless steel trim, the forces imparted on the internal plug receptacle may damage the receptacle and other attached internal components.

Thus, this exemplary embodiment protects the internal plug receptacle and other internal components of the mobile device by receiving external forces and distributing the forces to the side wall and back surface of the external housing. This embodiment also limits the chances of moisture penetration to the sensitive internal components of the electronic device. The above described trim is also configured to align the plug and plug receptacle during plug attachment to reduce the chances of improper plug insertion. Moreover, the stainless steel trim does not interfere with the aesthetics of the mobile device because the device may be incorporated internally and may be substantially concealed by the external housing.

Further features of the invention, its nature and various advantages will be more apparent from the accompanying drawings and the following detailed description.

DETAILED DESCRIPTION

Figure 1:
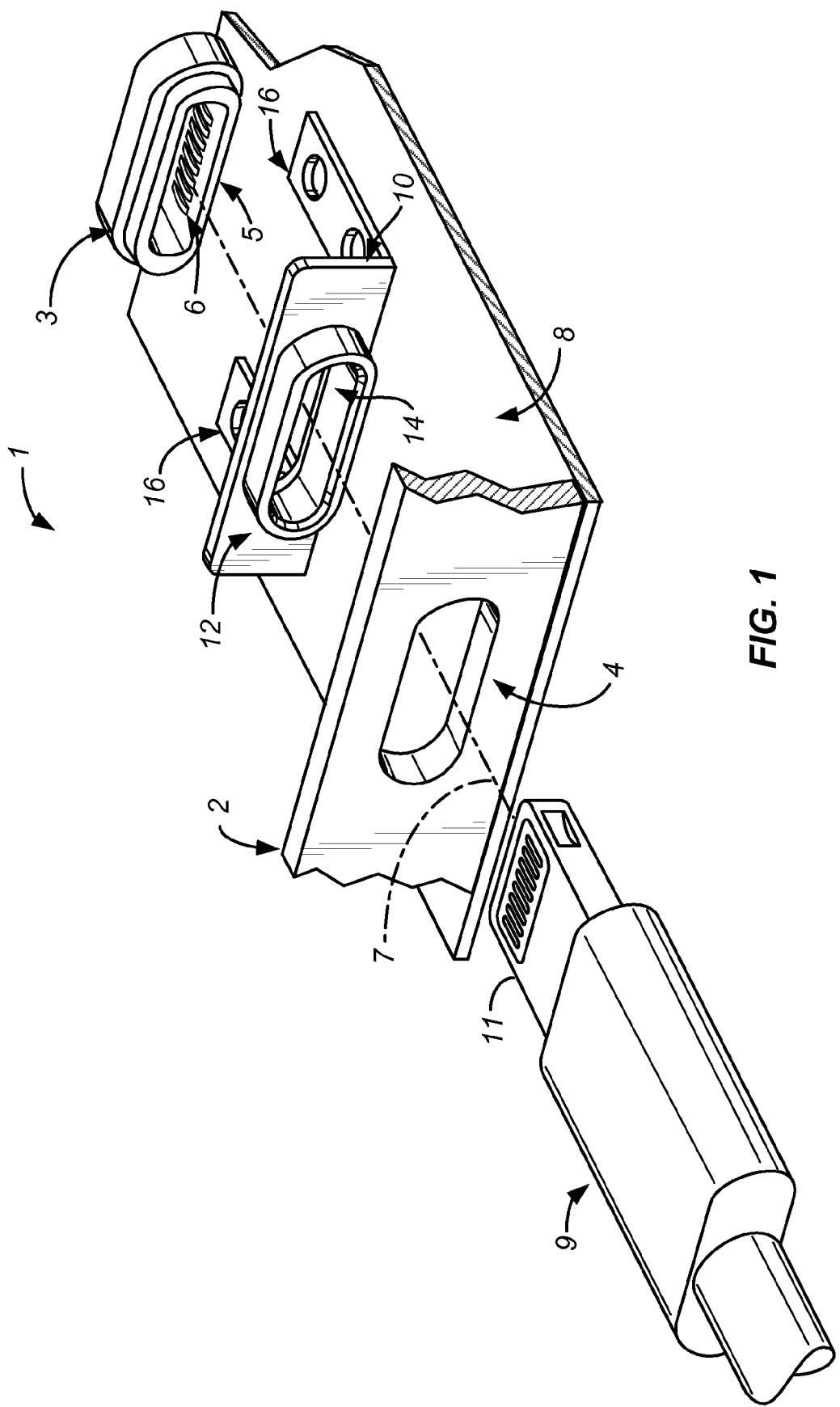
FIG. 1 depicts an exploded view showing the cooperation between an exemplary embodiment with a corresponding side housing, back housing, plug receptacle, and plug.

FIG. 1 illustrates an exploded view of trim 1 according to an exemplary embodiment of the invention. It shows the operational assembly of exemplary trim 1 with corresponding side housing 2, corresponding back housing 8, corresponding plug receptacle 3, and corresponding plug 9. Broadly, trim 1 includes trim body 10, lip 12, trim opening 14 and bracket 16. Lip 12 of trim 1 closely fits and cooperates with housing opening 4 of side housing 2. Similarly the walls of trim opening 14 closely fit and cooperate with the outer walls of connector 11 of plug 9. Bracket 16 fastens trim 1 to back housing 8. Plug receptacle 3 has engagement feature 5 which attaches to a corresponding engagement feature on the back surface of trim 1. The corresponding engagement feature can be more easily seen in FIG. 3 of the present application. Connector 11 translates along plug insertion axis 7 through housing opening 4 and trim opening 14 to attach to and detach from plug receiver 6. Plug insertion axis 7 also defines a desired alignment of side housing 2, trim 1, and plug receptacle 3.

As set forth above and shown in FIG. 1, it may be preferable for the walls of trim opening 14 to closely fit the outer walls of connector 11. A close fitting cooperation between the walls of trim opening 14 and the outer walls of connector 11 allows a portion of relative forces between attached plug 9 and electronic device (except for translational forces along plug insertion axis 7) to be distributed to trim 1. Trim 1 may then distribute the received force to other support structures of the electronic device. For example, bracket 16 of trim 1 may distribute received forces to portions of back housing 8. A loose fitting connection between the walls of trim opening 14 and the outer walls of connector 11 may allow a larger portion of force to be distributed to plug receptacle 3. The larger portion of force may damage the electronics of plug receiver 6 or other internal components of the electronic device.

In some embodiments the close fitting cooperation between the walls of trim opening 14 and the outer walls of connector 11 may help align a received plug during plug attachment to help ensure proper plug insertion. In certain other embodiments, the walls of trim opening 14 are made of a substantially hard and durable material so as to endure repeated insertion and removal of a plug. Thus, in some embodiments trim opening 14 reduces the amount of wear on housing opening 4.

In addition to the close fitting walls described above and as shown in FIG. 1, it may be preferable for trim opening 14 to have a non-circular cross-section about plug insertion axis 7. A non-circular cross-section about plug insertion axis 7 allows the close fitting walls of trim opening 14 to counter relative moment forces about plug insertion axis 7. If trim opening 14 has a circular cross-section about plug insertion axis 7, the walls of trim opening 14 would not be able to counter relative moment forces about plug insertion axis 7 because the walls would not oppose such a force. This is not an essential feature because some connectors 11 have circular cross-sections about plug insertion axis 7 and may freely rotate while attached to the electronic device without causing damage to the internal components of the electronic device. For example, traditional headphone connectors and some power charging connectors may rotate while attached without causing damage to the internal components of the electronic device. Thus, alternative embodiments of the present invention may have a trim opening 14 with a circular cross-section. In these instances, it may still be preferable for the walls of trim opening 14 to closely fit the outer walls of connector 11, so that forces perpendicular to plug insertion axis 7 may be distributed to trim 1. Trim 1 may then distribute the forces to support structures of the electronic device.

Also as shown in FIG. 1, it may be preferable for lip 12 and the walls of housing opening 4 to be configured to closely fit one another so as to improve force distribution from trim 1 to side housing 2. Similar to the close fitting cooperation between the walls of trim opening 14 and the outer walls of connector 11, a close fitting cooperation between the walls of lip 12 and the walls of housing opening 4 allows trim 1 to distribute forces to side housing 2. Alternatively, if lip 12 and housing opening 4 were not configured to fit closely with one another, a force received by trim 1 will not immediately be distributed from lip 12 to the walls of housing opening 4. This feature is non-essential because trim 1 may distribute received forces via bracket 16. Thus, alternative embodiments of the present invention may include a configuration of lip 12 which does not closely fit or cooperate with a corresponding housing opening 4.

In some embodiments a close fitting lip 12 may help align trim 1 with side housing 2 to simplify the assembly of the electronic device. Additionally, the close fitting lip 12 may minimize the introduction of assembly deviations between similar devices during device assembly. Moreover, certain embodiments utilize a close fitting lip 12 to limit the ability for moisture to access sensitive internal components of the electronic device.

Additionally, it may be preferable that lip 12 and housing opening 4 have a non-circular cross-section about plug insertion axis 7 as shown in FIG. 1. These features may be preferable because they allow trim 1 to transfer a received moment force about plug insertion axis 7 directly from lip 12 to the walls of housing opening 4. Trim 1 will not be able to directly distribute a received moment force about plug insertion axis 7 from lip 12 to the walls of housing opening 4 if lip 12 and housing opening 4 have circular cross-sections about plug insertion axis 7. The moment force is not distributed to side housing 2 because the walls of housing opening 4 would not oppose such a moment force. This feature is preferable, but not essential because trim 1 may distribute received forces via bracket 16. Similarly, as set forth above with respect to the discussion of the walls of trim opening 14, some connectors 11 have circular cross-sections about plug insertion axis 7 and may freely rotate while attached to the electronic device without causing damage to the internal components of the electronic device. With these connectors 11, it makes no difference whether lip 12 has a circular cross-section about plug insertion axis 7. Thus some embodiments of the present invention may have a lip 12 with a circular cross-section about plug insertion axis 7.

FIG. 1 also illustrates that bracket 16 may be fastened to back housing 8. In alternative embodiments, bracket 16 may include a single bracket rather than a plurality of brackets. Further, bracket 16 may be fastened to side housing 2 or may be fastened to other intermediate support structures to divert the external forces away from sensitive internal components. Further details of trim 1 may be appreciated with the discussion of FIGS. 2-4.

Figures 2, 3:
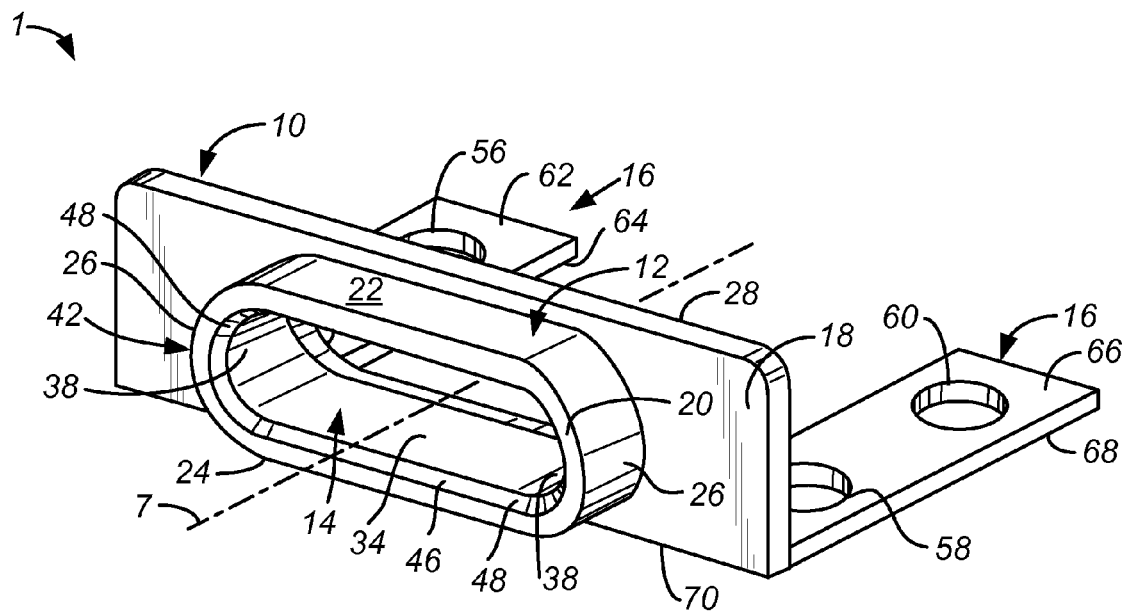
FIG. 2 depicts a front view of the exemplary embodiment shown in FIG. 1.
FIG. 3 depicts a back view of the exemplary embodiment shown in FIG. 1.
Figure 4:
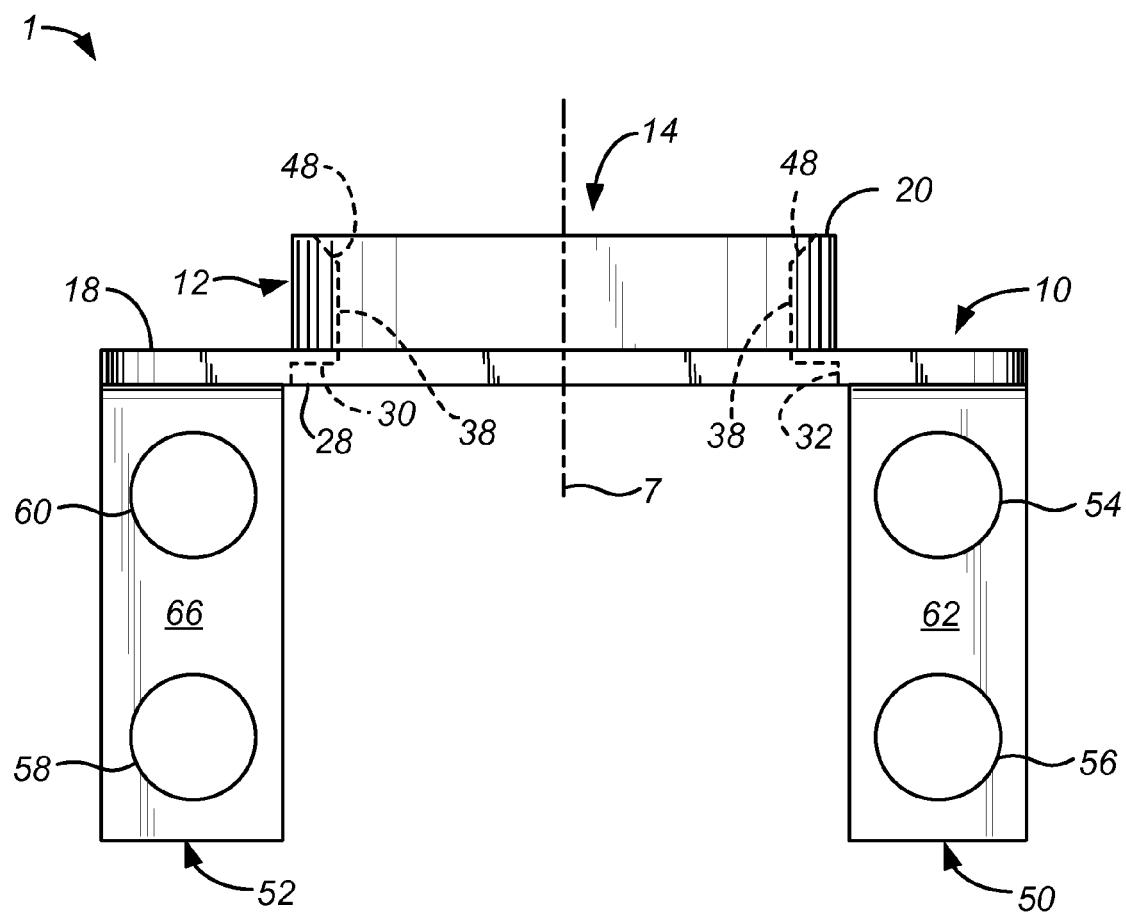
FIG. 4 depicts a top view of the exemplary embodiment shown in FIG. 1.

FIGS. 2-4 are various views of trim 1 in FIG. 1. A front view, a back view, and a top view of the exemplary embodiment are illustrated in FIGS. 2-4, respectively. Trim 1 includes trim body 10, lip 12, trim opening 14, and brackets 16. More specifically, trim 1 has trim body 10 with front surface 18. As can be seen more clearly in FIG. 3, trim body 10 further has back surface 28 opposite front surface 18. Back surface 28 is preferably but not necessarily planar and parallel to front surface 18. Further, back surface 28 includes recessed portion 30 facing in a back direction. In this embodiment, ledge 32 is interposed between back surface 28 and recessed portion 30. Ledge 32 is perpendicular to back surface 28 and recessed portion 30 and recessed portion 30 is parallel to back surface 28.

Lip 12 extends in a front direction from front surface 18. Lip 12 has a number of lip walls and front lip face 20 adjacent to the lip walls. The lip walls extend perpendicular to front surface 18. The lip walls of lip 12 include upper lip face 22, lower lip face 24, and a pair of side lip faces 26 extending between upper lip face 22 and lower lip face 24. Upper lip face 22 and lower lip face 24 are illustrated as generally planar and parallel to one another. Further, side lip faces 26 are illustrated as arcuate. Additionally, front lip face 20 is perpendicular to the lip walls and parallel to front face 18.

Trim opening 14 extends through lip 12 and trim body 10 from front lip face 20 to recessed portion 30. As shown in FIGS. 2 and 3, trim opening 14 has a number of opening walls. In this particular embodiment, the opening walls include lower opening wall 34, upper opening wall 36, and a pair of side opening walls 38 extending between upper opening wall 36 and lower opening wall 34. In this exemplary embodiment, upper opening wall 36 and lower opening wall 34 are preferably but not necessarily planar and parallel to upper lip face 22 and lower lip face 24. Additionally, side opening walls 38 are preferably but not necessarily arcuate and concentric with one of side lip faces 26. Further, in this particular embodiment recessed portion 30 forms a perimeter around trim opening 14 along back surface 28. Recessed portion 30 acts as a socket to receive engagement feature 5 (FIG. 1) of plug receptacle 3 (FIG. 1) and to help align trim 1 with plug receptacle 3 (FIG. 1).

Bevel surface 42 is interposed between front lip face 20 and the opening walls of trim opening 14. In this particular embodiment, bevel surface 42 includes upper bevel surface 44 (FIG. 5-6), lower bevel surface 46, and side bevel surfaces 48 extending between upper bevel surface 44 and lower bevel surface 46. In operation, bevel surface 42 may assist in guiding and aligning connector 11 of plug 9 relative to the assembly of trim 1, side housing 2, and plug receptacle 3 during attachment and detachment of connector 11 from plug receptacle 3 (FIG. 1). Bevel surface 42 may be particularly useful for aligning connector 11 in embodiments where the walls of trim opening 14 closely fit and cooperate with the outer walls of connector 11 (FIG. 1).

The exemplary embodiment further includes bracket 16. Bracket 16 includes right bracket 50 and left bracket 52, both of which are cantilevered in a back direction perpendicular to back surface 28. Right bracket 50 includes front fastener opening 54 and back fastener opening 56. Similarly, left bracket 52 includes front fastener opening 58 and back fastener opening 60. Right front fastener opening 54 and right back fastener opening 56 extend from right bracket upper surface 62 through right bracket 50 to right bracket lower surface 64 in a direction perpendicular to lower surface 64. Similarly, left front fastener opening 58 and left back fastener opening 58 extend from left bracket upper surface 66 through left bracket 52 to left bracket lower surface 68. Further, left bracket lower surface 68 and right bracket lower surface 64 are generally flush with lower trim surface 70. Bracket 16 may be used to mechanically fasten trim 1 to a portion of the electronic device's housing or to other intermediate support structures.

Although trim 1 has been described in detail with regard to FIGS. 2-4, it will be appreciated that trim 1 as described herein is illustrative and that variations and modifications are possible. For instance, although this particular embodiment has a planar front surface 18, other embodiments may have a curved front surface 18. The configuration of front surface 18 may depend on the configuration of corresponding side housing 2 (FIG. 1).

Further, as shown in FIGS. 2-4, in this exemplary embodiment lip 12 extends generally perpendicular from front surface 18 in a front direction. In other embodiments of the present invention, lip 12 may extend from front surface 18 at different angles. In some embodiments, lip 12 extends a distance corresponding to the thickness of side housing 2 so that in operation, front lip face 20 is configured to be flush with the outer surface of side housing 2. This particular embodiment may provide a more aesthetic appeal for the electronic device.

In some embodiments, bevel surface 42 may adjoin the plurality lip walls in which case a lip 12 comprises a front lip edge. As used in this context, front lip face 20 is broad enough to include a front lip edge in instances where bevel surface 42 adjoins the lip walls. Further it should be appreciated that it is not essential for bevel surface 42 to be uniform about front lip face 20. Bevel surface 42 does not necessarily need to be planar—other embodiments may use curved surfaces. Additionally front lip face 20 does not need to be planar. An outwardly curving front lip face 20 may assist in guiding and aligning connector 11 relative to the trim body 10, and may be used in the alternative to bevel surface 42.

Additionally, it should be appreciated that lip 12 may have many different configurations. For example, side lip faces 26 do not necessarily need to be arcuate as shown. Side lip faces 26 may be planar and perpendicular to upper lip face 22 and lower lip face 24. Alternatively, each of the side lip faces 26 may have separate or non-identical configurations. Upper lip face 22 and lower lip face 24 may also be planar or curved. Additionally it is not essential for upper lip face 22 and lower lip face 24 to correspond with one another. Many configurations of lip 12 are possible without departing from the scope of the present invention. As set forth above when discussing FIG. 1, the configuration of lip 12 may depend on the configuration of housing opening 4 of side housing 2 (FIG. 1). Lip 12 may be configured to closely fit with the walls of housing opening 4 to facilitate the distribution of force from trim 1 to side housing 2 (FIG. 1), to simplify assembly of trim 1 to housing 2, or to reduce chances of moisture penetration to the internal components of the electronic device. Thus, the configuration of lip 12 may depend upon the configuration of housing side 2 (FIG. 1) in which the trim is to be fitted. In alternative embodiments, the configuration of lip 12 may be independent of housing opening 4 because trim 1 may distribute forces via bracket 16 or other may include ring seals to limit moisture penetration.

Further, similar to the configuration of lip 12, it should be appreciated that trim opening 14 may have varying configurations between embodiments. Trim opening 14 may be configured to closely fit various connector 11 configurations so as to assist in aligning connector 11 in a particular manner, similar to how lip 12 may correspond to housing opening 4 (FIG. 1). Thus, it is not essential for the trim opening 14 to correspond to portions of lip 12 because housing opening 4 (FIG. 1) may have a different configuration than that of connector 11.

In addition, any number of brackets 16 may be used, if at all. Some embodiments may only use a single bracket 16, as shown in FIGS. 13-17. Additionally, bracket 16 may extend from various surfaces of trim body 10 and at various angles from trim body 10. Further, right bracket 50 and left bracket 52 do not need to be symmetrical, as can be seen in the embodiment of FIGS. 9-12, or attach at opposite sides of trim body 10. Each fastener opening may be threaded to receive a corresponding fastener in a shape-matched manner. Bracket 16 is preferable, but not essential to fasten trim 1 to side housing 2 or back housing 8 (FIG. 1). For example, some embodiments of the present invention include fastener openings in trim body 10 for securing trim 1 to a portion of the electronic device. In the embodiment illustrated in FIG. 1, trim 1 takes advantage of both the configuration of lip 12 and brackets 16 to distribute a received force throughout the attached housing.

Similar to lip 12 and trim opening 14 discussed above, recessed portion 30 and ledge 32 may have many different configurations depending on a corresponding configuration of engagement feature 5 of plug receptacle 3 (FIG. 1). For example, ledge 32 may be angled rather than perpendicular to both back surface 28 and recessed portion 30. Further, ledge 32 and recessed portion 30 may be combined together to form a rounded recessed surface.

Figure 5:
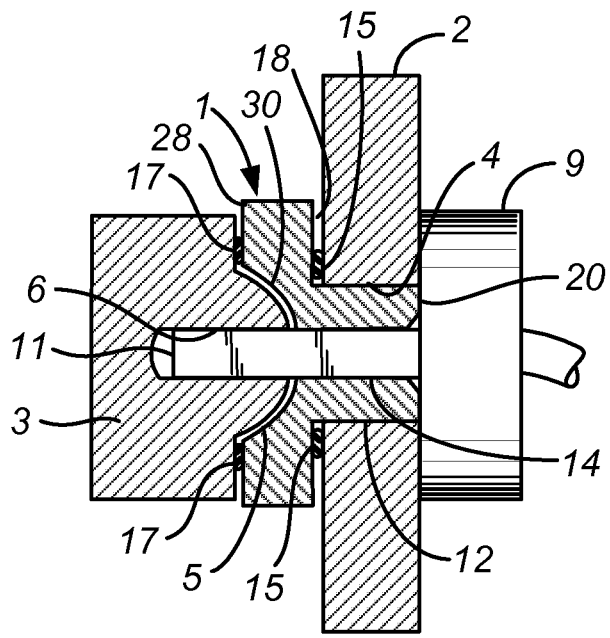
FIG. 5 depicts a cross-sectional view of the operational assembly of an exemplary embodiment with a corresponding side housing, plug receptacle, and plug.

An exemplary rounded recessed surface is illustrated in cross-section in FIG. 5. The cross-sectional view illustrated in FIG. 5 shows an exemplary trim 1 with lip 12, trim opening 14, and a curved recessed portion 30. Lip 12 fits and cooperates with housing opening 4 of side housing 2. Lip 12 extends from front surface 18 a distance corresponding to the thickness of side housing 2 such that front lip face 20 is flush with the outer surface of side housing 2. This embodiment may provide a more aesthetic appearance for the electronic device. Ring seal 15 is interposed between front surface 18 of trim 1 and side housing 2 to limit the moisture penetration into the device at the attachment of these two components. Ring seal 15 also lends flexibility to the mechanical construct. Plug receptacle 3 includes a corresponding engagement feature 5 which interfittingly mates with curved recessed portion 30 of trim 1. Further, ring seal 17 is interposed between back surface 28 of trim 1 and plug receptacle 3 to similarly limit moisture penetration into the device at the engagement of these two components. Plug 9 includes connector 11 which may attach to and detach from plug receiver 6. Further, trim opening 14 of trim 1 closely fits with connector 11.

Figure 6:
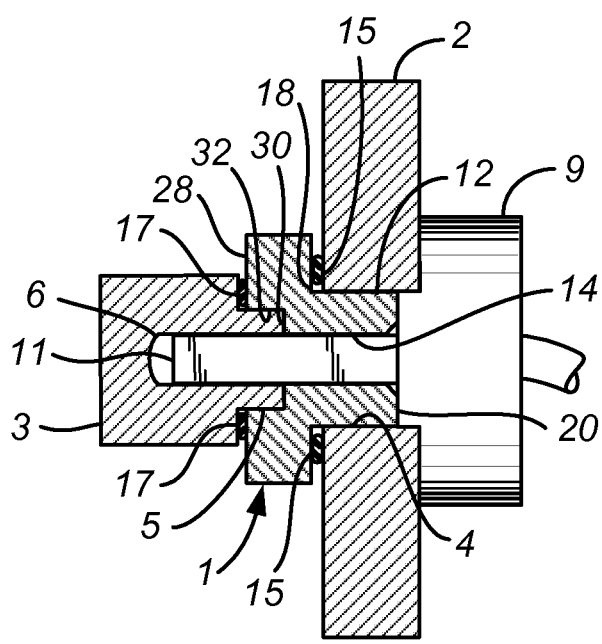
FIG. 6 depicts another cross-sectional view of the operational assembly of another exemplary embodiment with a corresponding side housing, plug receptacle, and plug.

FIG. 6 illustrates a cross-sectional view of another exemplary embodiment and the corresponding side housing 2, plug receptacle 3 and plug 9. Similar to FIG. 5, trim 1 has lip 12, trim opening 14, and recessed portion 30. In this embodiment, lip 12 does not extend a distance corresponding to the thickness of side housing 2 from front surface 18. Thus front lip face 20 is not flush with the outer surface of side housing 2. In this particular embodiment, plug 9 may have a tiered connector surface which also facilitates force distribution and plug alignment. Further, ring seal 15 and ring seal 17 limit the amount of moisture penetration into the electronic device and also lend flexibility to the mechanical construct, similar to the embodiment described above. Here, recessed portion 30 is parallel to back surface 28. Plug receptacle 3 includes engagement feature 5 which interfittingly mates with recessed portion 30 of trim 1 and aligns plug receptacle 3 to trim 1.

Figure 7:
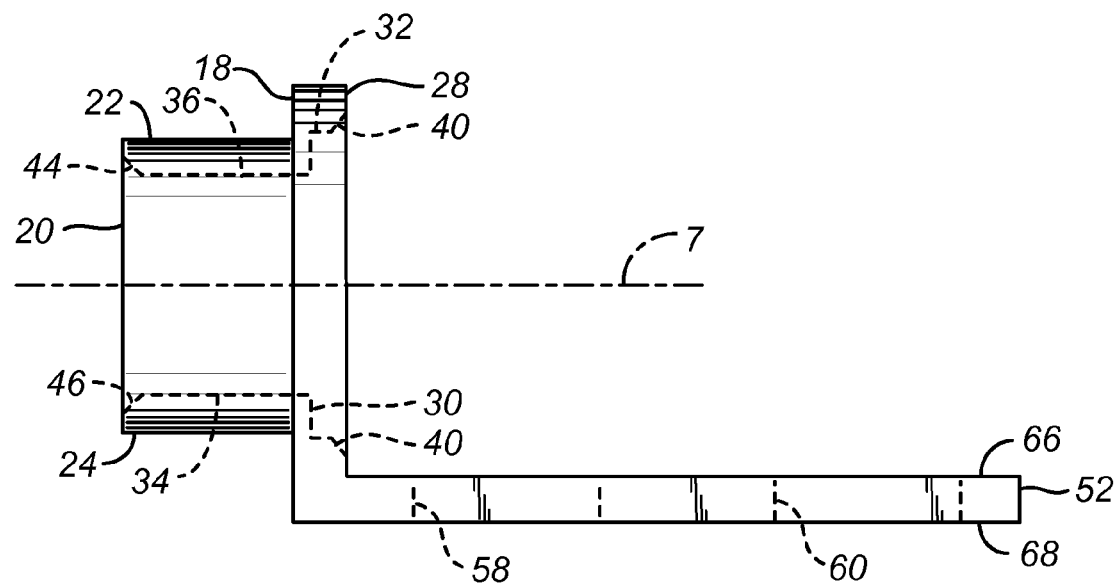
FIG. 7 depicts a side view of an exemplary embodiment similar to the embodiment shown in FIG. 1 with an additional chamfer surface.
Figure 8:
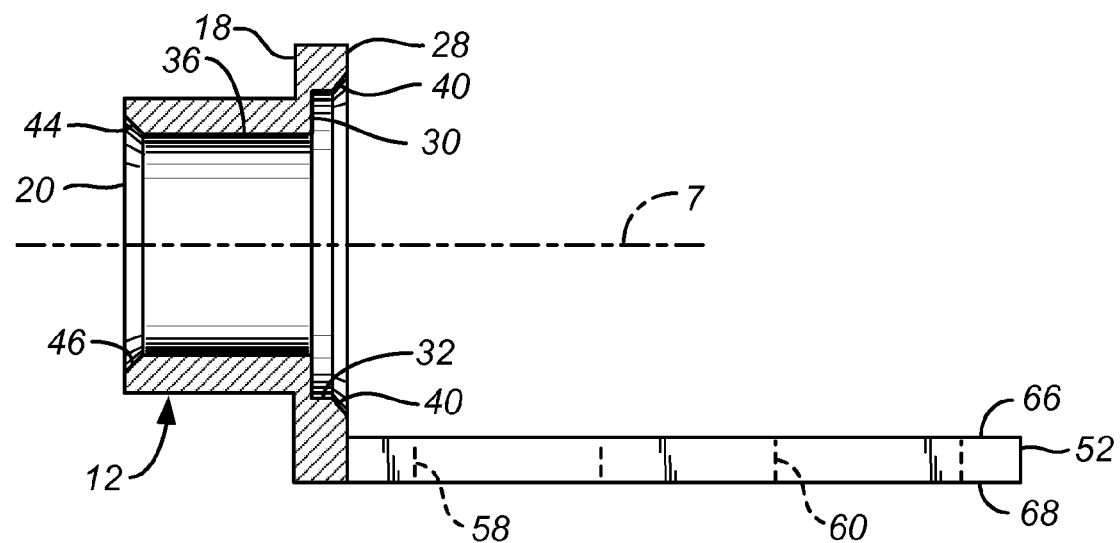
FIG. 8 depicts a cross-sectional view of the exemplary embodiment shown in FIG. 7.

In further embodiments, a chamfer surface may be interposed between the back surface 28 and ledge 32 as can be seen in FIGS. 7-8. FIGS. 7 and 8 show a side view and a cross-sectional view of an exemplary embodiment. This exemplary embodiment is similar to the embodiment depicted in FIGS. 2-4, however, this embodiment further includes chamfer surface 40 interposed between ledge 32 and back surface 28. Chamfer surface 40 operates similar to bevel surface 42—chamfer surface 40 may assist with guiding and aligning the engagement feature 5 of plug receptacle 3 (FIG. 1) relative to the trim 1.

Although recessed portion 30 has been described in detail, it will be appreciated that recessed portion 30 as described herein is illustrative and that variations and modifications are possible. For example, recessed portion 30 may comprise recessed notches at various locations on back surface 28 and along the perimeter of trim opening 14. It should be clear that many different configurations are possible and will likely depend on a configuration of engagement feature 5 of plug receptacle 3. Alternatively, trim 1 may include other engagement and/or alignment features for aligning plug receptacle 3. For example, back surface 28 may include protrusions or depressions which interfittingly mate with corresponding protrusions or depressions of plug receptacle 3. FIGS. 9-12 illustrate an exemplary embodiment with an alternative recessed portion 30 and further show an exemplary method of manufacture.

FIGS. 9-12 depict various views of another exemplary embodiment. Some features of FIGS. 9-12 overlap with the features described in FIGS. 2-4. FIGS. 9-12 provide a front view, a back view, a top view, and a second front view, respectively, of component 100 and component 102 which may be manufactured separately and then assembled together to form trim 1.

Figure 9:
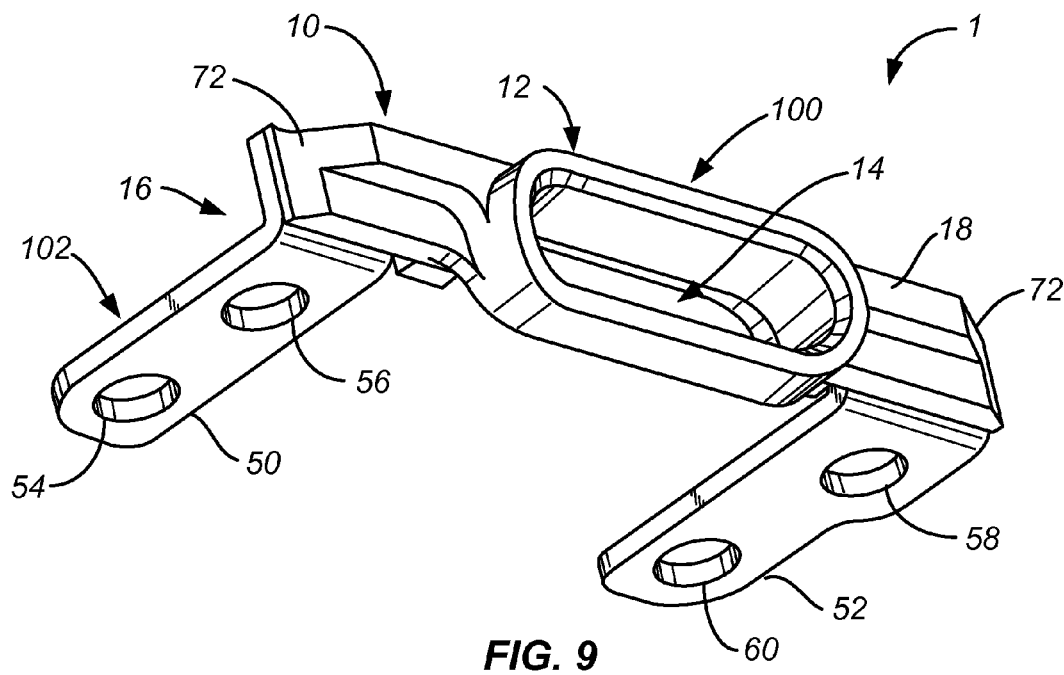
FIG. 9 depicts a front view of yet another exemplary embodiment.
Figure 10:
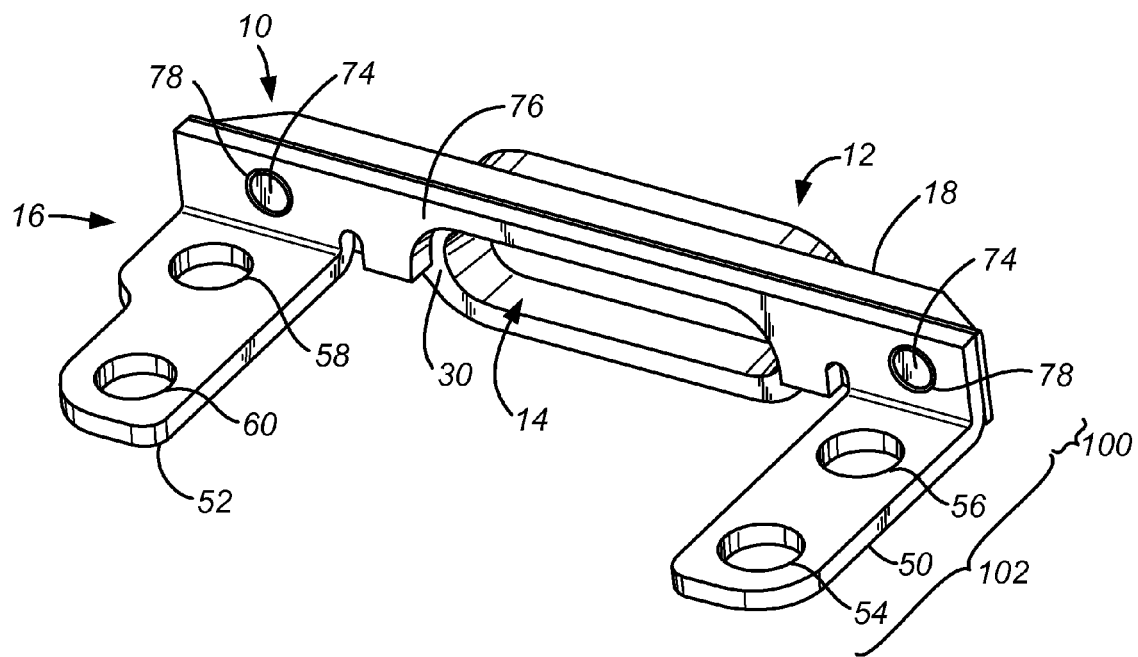
FIG. 10 depicts a back view of the embodiment shown in FIG. 9.
Figure 11:
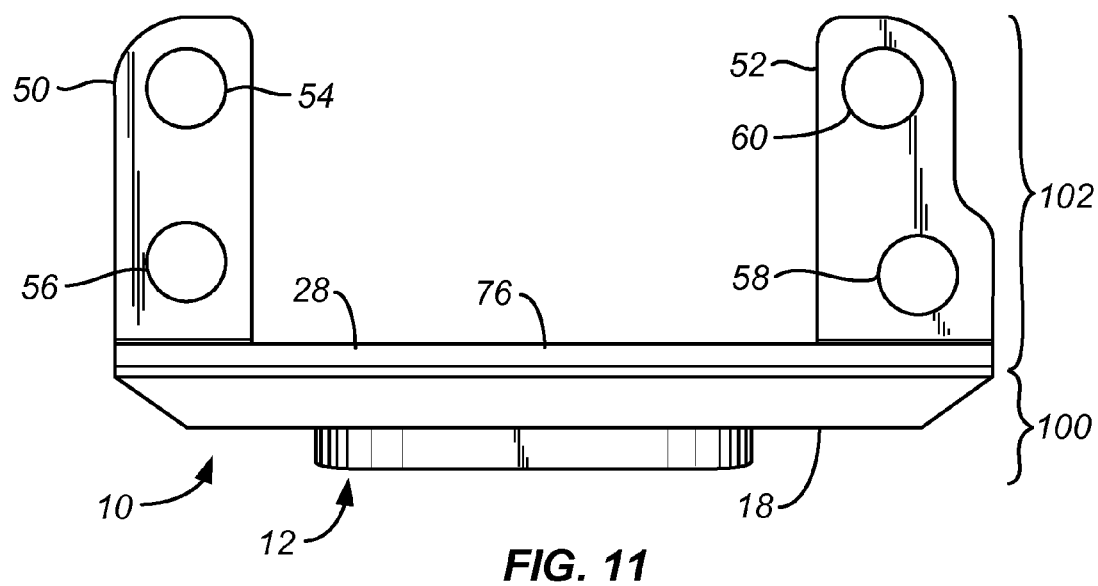
FIG. 11 depicts a top view of the embodiment shown in FIG. 9.
Figure 12:
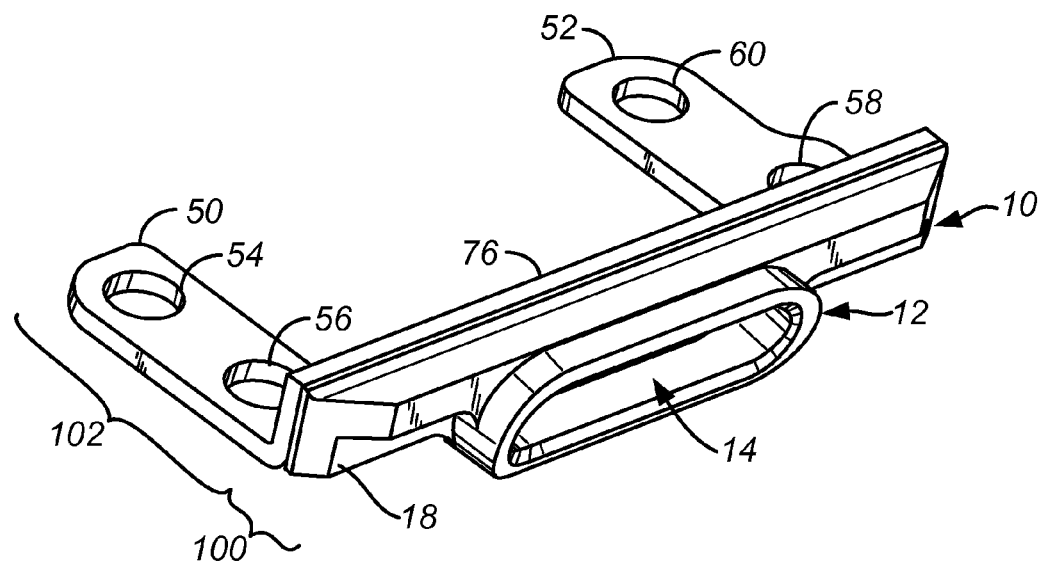
FIG. 12 depicts another front view of the embodiment shown in FIG. 9.
Figure 13:
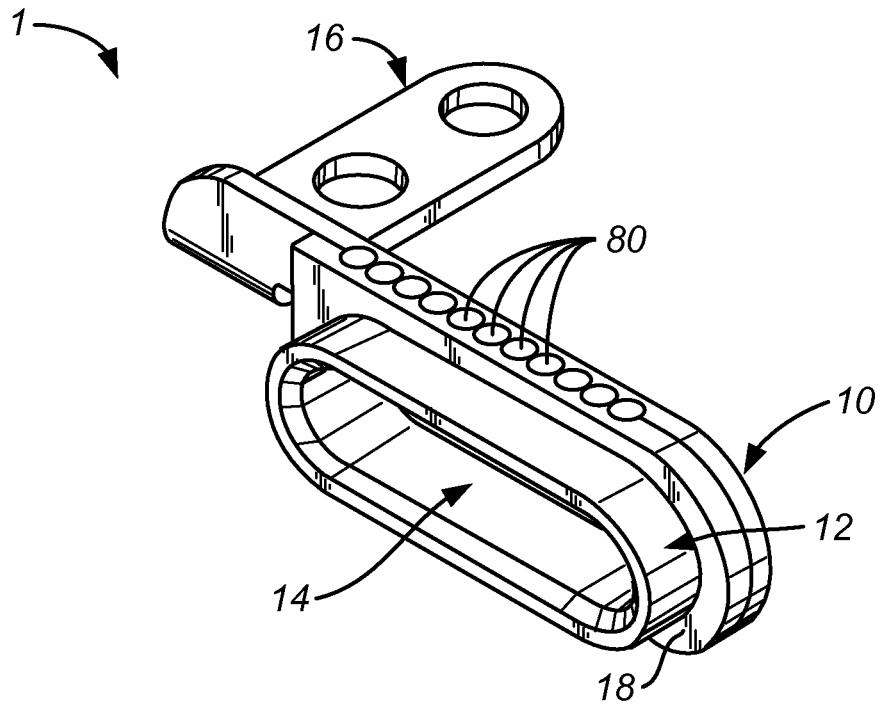
FIG. 13 depicts a front view of yet another exemplary embodiment.

Component 100 includes the front portion of trim body 10, lip 12, and trim opening 14. The front portion of trim body 10 includes a tiered front face 18 which may increase the load distributing surface of trim 1 to side housing 2 (FIG. 1). The tiered front surface 18 may also align trim 1 to side housing 2 (FIG. 1) to simplify the assembly of the electronic device. Moreover, the left and right edges 72 of front surface 18 are beveled which may align and guide trim 1 to side housing 2 (FIG. 1) during assembly. Lip 12 extends perpendicular to tiered front surface 18 in a front direction, however, only a portion of the walls of lip 12 extend from tiered front surface 18; other portions of lip 12 extend downwardly from the tiered front surface 18, as FIGS. 9 and 10 show. Trim opening 14 extends from the front face of lip 12 through lip 12 and the front portion of trim body 10 to the back surface of component 100. The back surface of component 100 corresponds to recessed surface 30 in the embodiments shown in FIGS. 2-8. Further the back surface of component 100 includes engagement features 74.

Component 102 includes the back portion 76 of trim body 10. Back portion 76 of trim body 10 includes engagement features 78 which correspond to engagement features 74. The engagement features of each component assist in aligning and attaching component 100 and 102 together. Component 102 further includes right bracket 50 and left bracket 52 cantilevered from back portion 76. Back portion 76 further includes an offset distance along the back surface of component 100 from trim opening 14 so as to create a recessed portion 30 when component 100 and component 102 are assembled together.

Component 100 and component 102 may be manufactured by CNC machining Alternatively, component 102 may be stamped and then attached to component 100, or according to any other desired manufacturing method such as casting, for example. Right bracket 50 and left bracket 52 may be bent perpendicular to back portion 76 before or after attachment. Component 100 and component 102 may be joined by laser welding, engagement features, adhesives (e.g. pressure sensitive adhesive), or some combination of methods. Laser welding may provide higher attachment strength between component 100 and component 102. Adhesives may help limit the moisture penetration into the electronic device at the attachment interface between component 100 and component 102. It should be appreciated that many manufacturing possibilities are available. For example, the embodiment in FIGS. 1-8 may be manufactured in a similar fashion to that described above for the embodiment in FIGS. 9-12. Further, some embodiments, may be manufactured as a single piece by CNC machining FIGS. 13-17 further describe another exemplary embodiment and manufacturing method.

Figure 14:
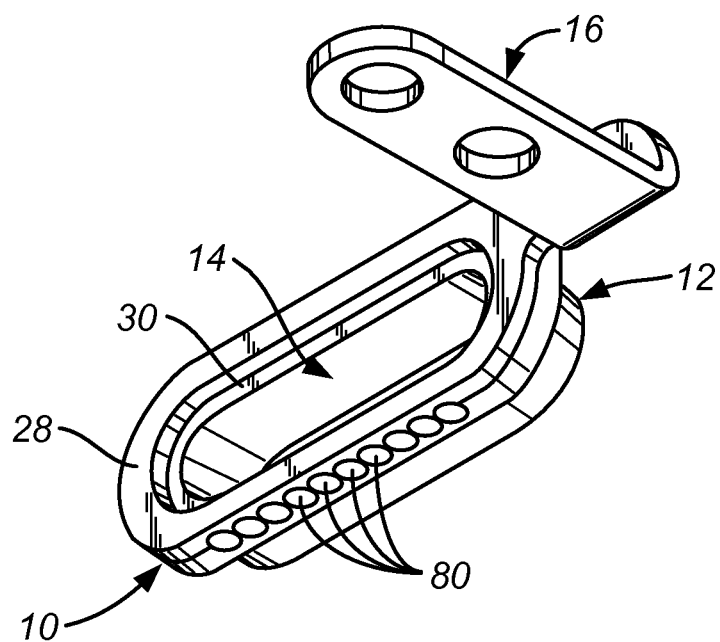
FIG. 14 depicts a back view of the embodiment shown in FIG. 13.
Figure 15:
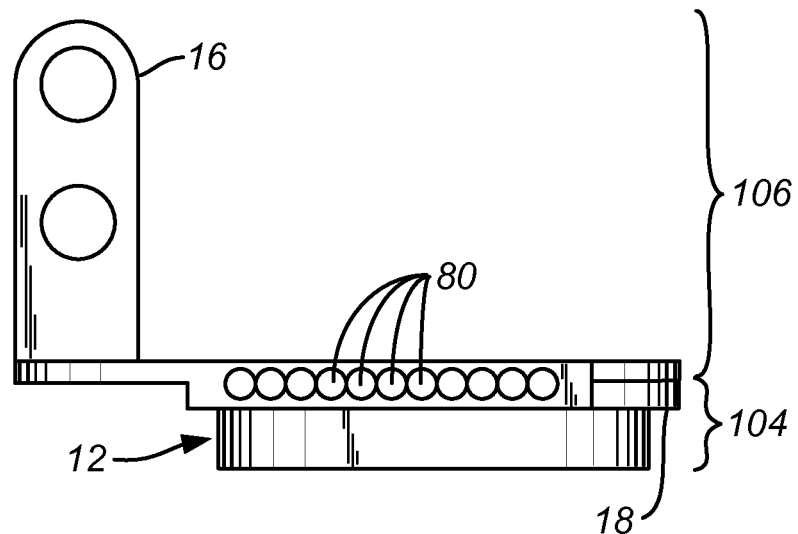
FIG. 15 depicts a top view of the exemplary embodiment shown in FIG. 13.
Figure 16:
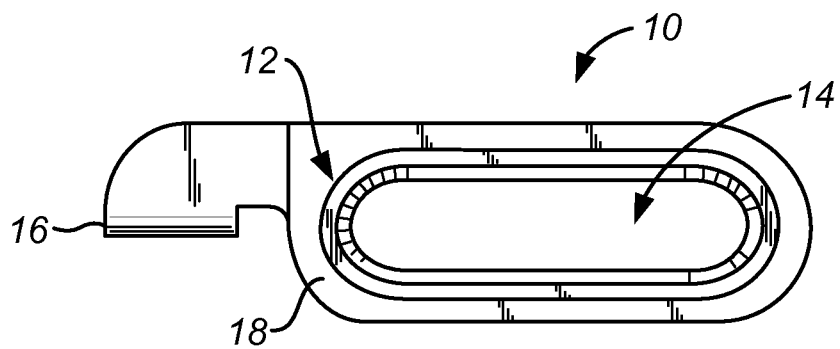
FIG. 16 depicts a second front view of the exemplary embodiment shown in FIG. 13.
Figure 17:
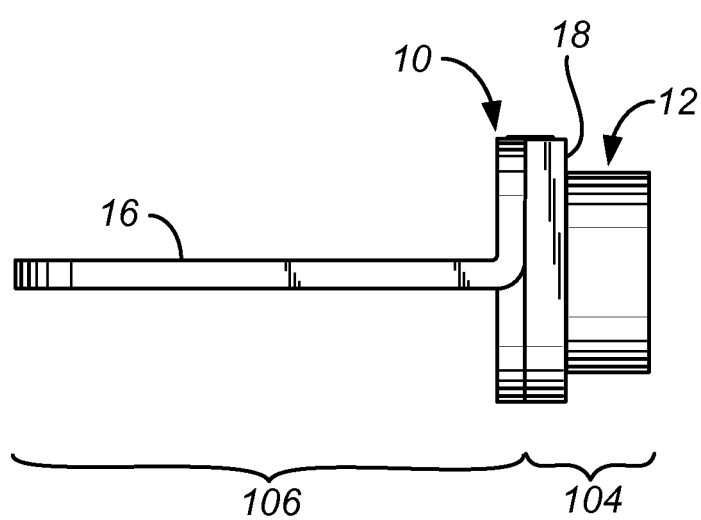
FIG. 17 depicts a side view of the exemplary embodiment shown in FIG. 13.

FIGS. 13-17 depict a front view, a top view, a second front view, and a side view, respectively, of yet another exemplary embodiment. This particular embodiment of trim 1 is manufactured by assembling and laser welding 80 component 104 and component 106 together (FIG. 15 and FIG. 17).

Component 104 includes the front portion of trim body 10, lip 12, and trim opening 14. Lip 12 extends perpendicular to front face 18 of the front portion of trim body 10. Trim opening 14 extends through lip 12 and the front portion of trim body 10 to the back surface of component 104. A portion of the back surface of component 104 forming a perimeter around trim opening 14 forms recessed portion 30 of trim 1 (FIG. 14).

Component 106 includes the back portion of trim body 10 and bracket 16. Bracket 16 is cantilevered from the back portion of trim body 10. The back portion of trim body 10 includes an opening corresponding to trim opening 14. The back portion's opening is an offset distance along the back surface of component 104 from trim opening 14 so as to form recessed portion 30 of trim 1 when component 104 and component 106 are assembled together. As set forth above, component 104 and 106 are separately manufactured and assembled together to form trim 1. The components may be made of stainless steel 316 L and laser welded 80 together. Other grades of stainless steel may be used. Additionally, other materials may be used as well without departing from the scope of the present disclosure. Component 104 and component 106 may be manufactured by CNC milling. In the alternative, component 106 may be stamped and then attached to component 104. If stamped, bracket 16 may be bent perpendicular to the back portion of trim body 10 before or after the assembly of component 104 and component 106 similar to the embodiment in FIGS. 9-12. Further, the back surface of component 104 may include engagement or alignment features for aligning component 104 with component 106 during assembly and laser welding. For example, the back surface of 104 may include protuberances or depressed surfaces which match corresponding protuberances or depressed surfaces on the front surface of component 106. Some embodiments of component 104 may include a slightly raised surface about the perimeter of trim opening 14 on the back surface. This raised perimeter surface about trim opening 14 may align component 104 with component 106 by closely fitting the inner walls of the corresponding opening in component 106. It should be appreciated that many manufacturing possibilities and alignment possibilities are available without departing from the scope of the present disclosure.

While exemplary embodiments have been described in some detail for clarity of understanding and by way of example, a number of changes, modifications, and adaptions may be obvious to those of skill in the art. Hence, the scope of the present invention is limited solely by the appended claims.

What is claimed is:

1. A trim configured to be substantially enclosed in an electronic device housing and configured to be interposed between the electronic device housing and an electronic device plug receptacle, the trim further configured to guide a plug along a plug insertion axis during attachment of the plug to the electronic device plug receptacle, the trim comprising:
   a trim body having a front surface and a back surface opposite the front surface, the back surface including a recessed portion configured receive a corresponding engagement feature of the electronic device plug receptacle;
   a lip configured to cooperate with an electronic device housing opening, the lip including a plurality of lip walls adjacent to and extending generally perpendicular from the front surface of the trim body in a front direction and a front lip face adjacent and perpendicular to the plurality of lip walls, and the lip defining a non-circular cross-section about and centered on the plug insertion axis;

a trim opening extending through the lip and the trim body from the front lip face to the recessed portion of the trim body, the trim opening forming a plurality of opening walls and the recessed portion forming a perimeter around the trim opening, the plurality of opening walls configured to receive an outer wall of a plug connector; and at least one bracket extending perpendicular to the back surface of the trim body in a back direction, the at least one bracket including an upper bracket face, a lower bracket face, and at least one fastener opening for receiving a fastener, the at least one fastener opening extending between the upper bracket face and the lower bracket face.

2. The trim of claim 1, wherein the at least one bracket includes a right bracket and a left bracket and each of the right bracket and the left bracket includes an upper bracket face, a lower bracket face, and at least one fastener opening for receiving a fastener, the at least one fastener opening extending between the upper bracket face and the lower bracket face.

3. The trim of claim 2, the plurality of lip walls comprising:
an elongated upper lip face;
an elongated lower lip face opposite the upper lip face, the lower lip face corresponding in shape to the upper lip face; and
a pair of arcuate side faces extending from the upper lip face to the lower lip face; and
wherein the plurality of opening walls comprises:
an upper opening wall that corresponds to the upper lip face;
a lower opening wall that corresponds to the lower lip face; and
a pair of arcuate opening side walls extending from the upper opening wall to the lower opening wall, the arcuate opening side walls corresponding with one of the arcuate side faces; and
wherein the trim further comprises a bevel surface interposed between the front lip face and the plurality of opening walls, the bevel surface configured to align and guide plug along the plug insertion axis during attachment of the plug to the electronic device plug receptacle.

4. The trim of claim 1, wherein the trim is manufactured as a single component by computer numerical control machining.

5. The trim of claim 1, wherein the trim comprises at least two components.

6. The trim of claim 3, wherein the elongated upper lip face and the elongated lower lip face are planar.

7. The trim of claim 3, wherein the front lip face is rounded in a front direction.

8. The trim of claim 3, further comprising a ledge between the recessed surface and the back surface, the ledge perpendicular to the back surface and wherein the recessed surface is parallel to the back surface.

9. The trim of claim 8, further comprising a chamfer surface interposed between the ledge and the back surface.

10. The trim of claim 2, wherein the right and left bracket are cantilevered from the back surface.

11. The trim of claim 2, wherein each of the at least one fastener opening of the right and left brackets are threaded fastener openings.

12. The trim of claim 11, wherein a right bracket face of the right bracket is generally flush with a right surface of the trim body and a left bracket face of the left bracket is generally flush with a left surface of the trim body.

13. The trim of claim 1, further comprising at least one ring seal, the at least one ring seal configured to be interposed between the trim and the electronic device housing or configured to be interposed between the trim and the electronic device plug receptacle.

14. A trim configured to be interposed between a device housing and an internal plug receptacle, the internal plug receptacle configured to attach a corresponding plug along a plug insertion axis, the trim comprising:
a first component comprising:
a front portion of a trim body, the front portion of the trim body comprising a tiered front face;
a back surface having one or more alignment features;
a lip extending in a front direction comprising a plurality of side walls and a front lip face adjacent to the plurality of side walls, at least a portion of the side walls extending from the front surface of the trim body, the lip having a non-circular cross-section about the plug insertion axis; and
an opening extending through the lip and the front portion of the trim body from the front lip face to the back surface of the first component, the opening having a non-circular cross-section about the plug insertion axis; and
a second component attached to the first component, the second component comprising:
a back portion of the trim body, the back portion of the trim body comprising one or more alignment features corresponding to the alignment feature on the back surface of the first component;
at least one bracket cantilevered from the back portion of the trim body, the at least one bracket including a plurality of fastener openings.

15. The trim of claim 14, wherein the first component is manufactured by computer numerical control machining and the second component is manufactured by at least one of computer numerical control machining and metal stamping, and wherein the first component and the second component are laser welded together.

16. The trim of claim 14, wherein the one or more alignment features of the back surface of the first component comprises two protuberances extending from the back surface, the two protuberances extending from opposite sides of the opening.

17. The trim of claim 14, further comprising a beveled surface interposed between the front lip face of the lip of the first component and a plurality of opening walls of the opening, the beveled surface configured to align and guide a received plug through the opening.

18. The trim of claim 14, wherein the second component is metal stamped and the left and right bracket are bent perpendicular to the back portion of trim body after stamping.

19. The trim of claim 14, wherein the at least one bracket includes left and right brackets, and each of the left and right brackets includes a plurality of fastener openings.

20. A trim configured to be interposed between a device hosing and an internal plug receptacle, the internal plug receptacle configured to attach a corresponding plug along a plug insertion axis, the trim comprising:
a first component comprising:
a front portion of a trim body comprising a front surface;
a back surface having one or more alignment features;
a lip comprising a plurality of side walls extending perpendicular to the front surface of the front portion of the trim body and a front lip face adjacent to the plurality of side walls, the lip having a non-circular cross-section about the plug insertion axis; and an opening extending through the lip and the front portion of the trim body from the lip front face to a back surface of the first component, the opening having a non-circular cross-section about the plug insertion axis;

a second component attaching to the first component, the second component comprising:

a back portion of the trim body, the back portion of the trim body comprising an elongate opening corresponding to the opening of the first component, wherein the opening of the back portion is an offset distance along the back surface of the first component from the opening so as to delineate a recessed portion around the opening of the first component; and a bracket cantilevered from the back portion of the trim body, the bracket comprising one or more fastener openings.

21. The trim of claim 20, wherein the first component is manufactured by computer numerical control machining and the second component is manufactured by at least one of computer numerical control machining and metal stamping, and wherein the first component and second component are laser welded together.

22. The trim of claim 21, wherein the first component and second component are attached to one another by an adhesive.

23. The trim of claim 20, wherein the bracket is configured to fasten to a boss of the electronic device housing.

24. The trim of claim 20, further comprising at least one ring seal, the at least one ring seal configured to be interposed between the trim and the device housing or configured to be interposed between the trim and the internal plug receptacle.

25. The trim of claim 20, wherein the second component is metal stamped and the bracket is bent to extend in a back direction from the back portion of the trim body.

\* \* \* \* \*